(12) United States Patent
Basil et al.

(10) Patent No.: US 12,539,237 B2
(45) Date of Patent: Feb. 3, 2026

(54) HYDRATING PATCH

(71) Applicant: Lini Basil, Kerala (IN)

(72) Inventors: Lini Basil, Kerala (IN); Senthilkumar Muthuswamy, Tamil Nadu (IN)

(73) Assignee: Lini Basil, Kerala (IN)

( * ) Notice: Subject to any disclaimer, the term of this patent is extended or adjusted under 35 U.S.C. 154(b) by 784 days.

(21) Appl. No.: 17/635,266

(22) PCT Filed: Aug. 15, 2020

(86) PCT No.: PCT/IN2020/050714
§ 371 (c)(1),
(2) Date: Feb. 14, 2022

(87) PCT Pub. No.: WO2021/028949
PCT Pub. Date: Feb. 18, 2021

(65) Prior Publication Data
US 2022/0287885 A1 Sep. 15, 2022

(30) Foreign Application Priority Data
Aug. 15, 2019 (IN) .............................. 201941033017

(51) Int. Cl.
*A61F 13/15* (2006.01)
*A61F 13/53* (2006.01)
*A61K 9/00* (2006.01)

(52) U.S. Cl.
CPC .............. *A61F 13/15* (2013.01); *A61F 13/53* (2013.01); *A61K 9/006* (2013.01); *A61F 2013/15008* (2013.01); *A61F 2013/530481* (2013.01)

(58) Field of Classification Search
None
See application file for complete search history.

(56) References Cited

U.S. PATENT DOCUMENTS

2005/0136112 A1* 6/2005 Gonzales ............. A61K 9/2086
424/473
2005/0232982 A1 10/2005 Ihara et al.

OTHER PUBLICATIONS

International Search Report for PCT/IN2020/050714 dated Nov. 9, 2020.

* cited by examiner

*Primary Examiner* — H. Sarah Park
(74) *Attorney, Agent, or Firm* — Millen, White, Zelano & Branigan, P.C.; Jennifer L. King

(57) ABSTRACT

The present invention relates to a hydrating patch. The hydrating patch (100) comprises a biodegradable and biocompatible absorbent inset (106). The absorbent inset (106) absorbs and retains a liquid, and discharge an absorbed liquid when pressed. The hydrating patch (100) also comprises a biocompatible matrix (102) which supports the absorbent inset (106). The biocompatible matrix (102) is flexible. To attach the biocompatible matrix (102) to a biological membrane, a sticking layer (110) is attached to the biocompatible matrix (102). The hydrating patch (100) can be attached in the oral cavity to alleviate dryness in a person having a dry mouth condition.

12 Claims, 3 Drawing Sheets

HYDRATING PATCH

FIELD OF THE INVENTION

The present invention relates to a patch to absorb and discharge liquid. In particular the present invention relates to a patch attachable inside the oral cavity.

BACKGROUND

Saliva, which is secreted by salivary glands, helps to moisturize the oral cavity. In addition, the naturally secreted saliva helps to cleanse the mouth from the food particulates or foreign bodies which may be stuck on the tooth and gums. The constituents of saliva also prevent infections in the oral cavity by controlling the growth of bacteria and fungi in the mouth. Thus saliva plays an important role in maintaining the oral hygiene.

In a medical condition termed as dry mouth also called as xerostomia, the secretion of saliva may be reduced or non-existent. Various causes which result in dry mouth include old age, nerve damage, smoking, chewing tobacco, and side effects of certain medications, medical treatments, and diseases.

The effects of dry mouth include dryness and discomfort, increased risk of gum disease, tooth decay, mouth infections, and difficulty in wearing dentures. In addition, a person suffering from dry mouth may resort to frequent in-take of water which can result in frequent urination.

Many products and techniques have been developed to address the dry mouth condition. Saliva substitutes, also known as artificial saliva, are liquid or aerosol products that are sprayed into the mouth. Alternatively, a cheek plumper with a saliva reservoir may be provided. Other solutions including chewable biomaterial, and appliance or pad with a moisturizing element to be fitted inside the mouth have been developed.

For example, U.S. Pat. No. 3,991,471 by Hoops Donald, entitled "Humidifying palate" discloses a palatal appliance for maintaining humidity in the mouth and respiratory tract consisting of a rigid plastic shell which substantially conforms to hard palate. The shell has a recess in the upper portion thereof to hold a sponge which can be saturated with liquid. Apertures extending through the floor of the recess allow the liquid to flow into the mouth at a controlled rate.

U.S. Pat. No. 4,917,674 of Molinoff Henry C, entitled "Mouth moisturizing device" discloses a mouth moisturizing device for treatment of an individual suffering from xerostomia comprising two mouth moisturizing pads, each of which includes at least two approximately oval shaped sponge sections placed adjacent each other of a size such that together the sponge sections just fit in a cheek pouch of the individual and an envelope or covering made of knit cotton cloth in which the sponge sections are held, and a connecting strap attached to both of the mouth moisturizing pads.

Though these solutions seek to address the hydration of the dry mouth, there are other requirements that need to be considered. As the dry mouth condition requires to be addressed over a long term, the comfort of the user and the ease of usage of the technical solution is an important aspect to be accounted. The user must be able to converse freely and the time interval after which the hydrating medium needs recharging must not be short.

Another important factor is hygiene. As any prolonged usage of a product inside the mouth is prone to develop microbial growth, it is desirable to use a disposable product with a reasonable life time of usage. While developing a disposable product, sufficient care to ensure that it is environment friendly and safe to dispose is also important.

OBJECTS OF THE INVENTION

The primary objective of the present invention is to moisturize the oral cavity and throat of a person experiencing dry mouth.

Another objective is to ensure that the present invention does not create discomfort for the person when conversing.

Yet another objective is to prolong the discharge time and reduce the recharging time.

A desirable objective is to ensure that the present invention is an environment-friendly product which ensures hygiene during usage.

SUMMARY

The present invention relates to a hydrating patch comprising an absorbent inset which can absorb and retain a liquid. When subjected to pressure, the absorbed liquid is discharged from the absorbent inset. The absorbent inset is composed of a mix of two biomaterials which are biocompatible and biodegradable. A flexible biocompatible matrix provides a support for the absorbent inset. To enable attachment of the biocompatible matrix to the oral cavity muscles, a sticking layer is provided on a first side of the biocompatible matrix. The flexibility of the biocompatible matrix ensures ease of use.

The biocompatible matrix with the absorbent inset is stuck to the buccal mucosa. The absorbent inset comprises a water swell-able fibrous protein and a plant based biomaterial which absorbs water during oral intake of water. When the cheek, lips, and tongue are moved, a pressure is exerted on the absorbent inset which in-turn discharges the absorbed water. The inherent antimicrobial properties of the plant extract which gets eluted with discharged water ensures the oral hygiene.

Further, the biocompatible matrix has a netted sub-structure. The shape of the absorbent inset is complimentary to the netted sub-structure. The absorbent inset is attached to the biocompatible matrix. As the absorbent inset absorbs water, it swells to fill a cavitated substructure of the absorbent inset. In the dry state and the swollen state, the exposed area of the absorbent inset is relatively same. Hence the volume to exposed area ratio is high in the swollen state and water discharges at a slower rate. Thereby the time duration after which recharging is required is prolonged.

The hydrating patch is reusable but after a suggested time period of use can be disposed. As the hydrating patch comprises components which are biodegradable material, disposal of the patch is safe.

These objectives and advantages of the present invention will become more evident from the following detailed description when taken in conjunction with the accompanying drawings.

BRIEF DESCRIPTION OF THE DRAWINGS

The objective of the present invention will now be described in more detail with reference to the accompanying drawing, wherein.

REFERENCE NUMERALS

Figure 1:
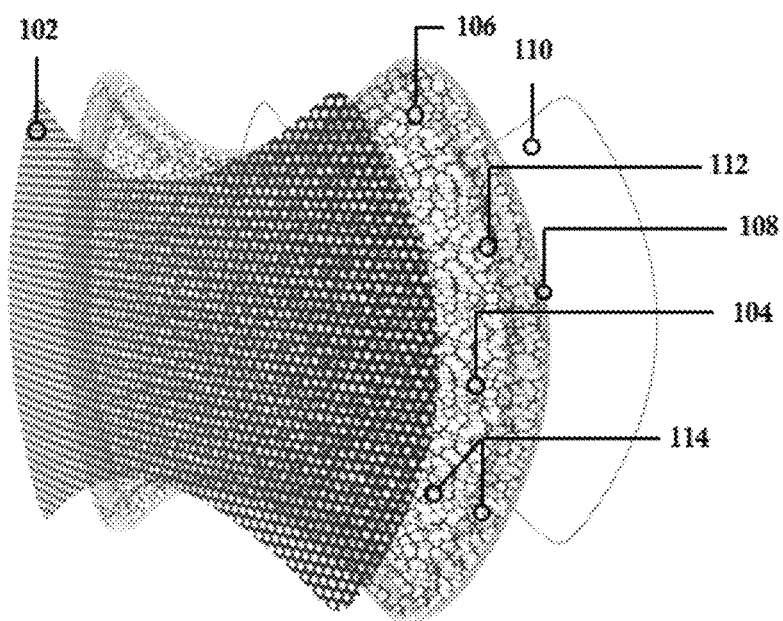
FIG. 1 illustrates an exploded view of a hydrating patch as an embodiment of the present subject matter.

Hydrating Patch 100
Biocompatible matrix 102
Cavitated substructure 104
Absorbent inset 106
First side 108
Sticking layer 110
Second side 112
Exposed area 114

DETAILED DESCRIPTION OF THE INVENTION

Hereafter, the features and working of the present invention is described in detail with reference to the drawings.

The invention is a flexible oral hydrating patch that includes hydrophilic polymers, that is designed to place in buccal are. In preferred embodiments, this insert is flexible and giving a soft feel in the mouth. The patch absorbs water taken by the patient and elute slowly upon mild tongue pressure or during movement of facial muscles. FIG. 1 illustrates an exploded view of a hydrating patch as an embodiment of the present subject matter. The hydrating patch 100 comprises three major components. A biocompatible matrix 102 provides a skeletal structure to the hydrating patch 100. The biocompatible matrix 102 is flexible and is a netted structure matrix with holes. An absorbent inset 106 is attached to the biocompatible matrix 102. The moisturizing functionality of the hydrating patch 100 is provided by the absorbent inset 106 which has a cavitated substructure 104. The requirement for the matrix is to remain inside a human mouth to support the absorbent insert, so that the slow degradation of absorbent insert will not make significant change in the overall hydrating patch even after desired time that is 9-12 hours. The shape of the absorbent inset 106 is complimentary to the biocompatible matrix 102 in order to fit the absorbent inset 106.

The absorbent inset 106 with limited or no water is in a dry state. When the absorbent inset 106 contacts water, it absorbs water and expands to reach a swollen state. The flexible nature of the biocompatible matrix 102 enable accommodation of the absorbent inset 106 in the swollen state. The absorbent inset 106 is composed of biomaterial. The biomaterial comprises at least an animal origin biomaterial and a plant origin biomaterial. Hence the absorbent inset 106 is both biocompatible and biodegradable. In an implementation, the absorbent inset 106 is a water swellable fibrous protein, which can increase to up to 10 to 15 fold of its weight in the dry state by absorbing water. When any pressure is applied on the absorbent inset 106, the absorbed water seeps out. When the amount of water retained in the absorbent inset 106 decreases, contacting the surface of the absorbent inset 106 with water leads to re-absorption. In an embodiment, the absorbent inset (106) slowly release absorbed water for at least three hours and reabsorbs when contacted with water.

The hydrating patch at a first side 108 is attached in the oral cavity. To enable the attachment a sticking layer 110 is attached on the first side 108. The biocompatible sticking layer become sticky when the hydrating patch is wet. The sticking layer 110 is a biocompatible sticking material and can be stuck on a biological membrane. The sticking layer 110 is also reusable and hence can be removed temporarily after sticking and stuck again. In an implementation, the sticking layer 110 sticks the first side 108 to the buccal mucosa in the oral cavity. The buccal mucosa is the lining of the cheeks and the back of the lips, inside where they touch the teeth in the oral cavity. A second side 112 of the hydrating patch is exposed to the oral cavity. The surface of the absorbent inset 106 at the second side 112 is an exposed area 114 of the absorbent inset 106 through which water is discharged out.

During movement of the cheek and lip muscles, the buccal mucosa is flexed which translates as a pressure on the absorbent inset 106. The first side 108 can also be stuck to the floor of the mouth using the sticking layer 110. The normal movement of the tongue applies a pressure on the absorbent inset 106. In response to the applied pressure some of the absorbed water is discharged, which moisturizes the oral cavity. Thus a person need not make any extra effort to discharge the water.

The discharged water serves to moisturize the oral cavity and throat. As the buccal mucosa contacts the teeth, the discharged water easily contacts the teeth surface and helps to keep it clean. Moreover one of the main functions of saliva is to control the growth of micro-organisms and fungi in the oral cavity. Water elutable antimicrobial and wound healing substances are inherently present in the absorbent inset 106. Due to this when the water is discharged from the absorbent inset 106, the antimicrobial substances are eluted and help in controlling the microbial growth in the oral cavity.

A hydrating patch 100 is sealed in a protective covering for storage and before use of the hydrating patch 100 to prevent any dust or damage on the absorbent inset 106. To use the hydrating patch 100, the protective covering is removed and the hydrating patch 100 is stuck to the buccal mucosa using the sticking layer 110.

Figure 2:
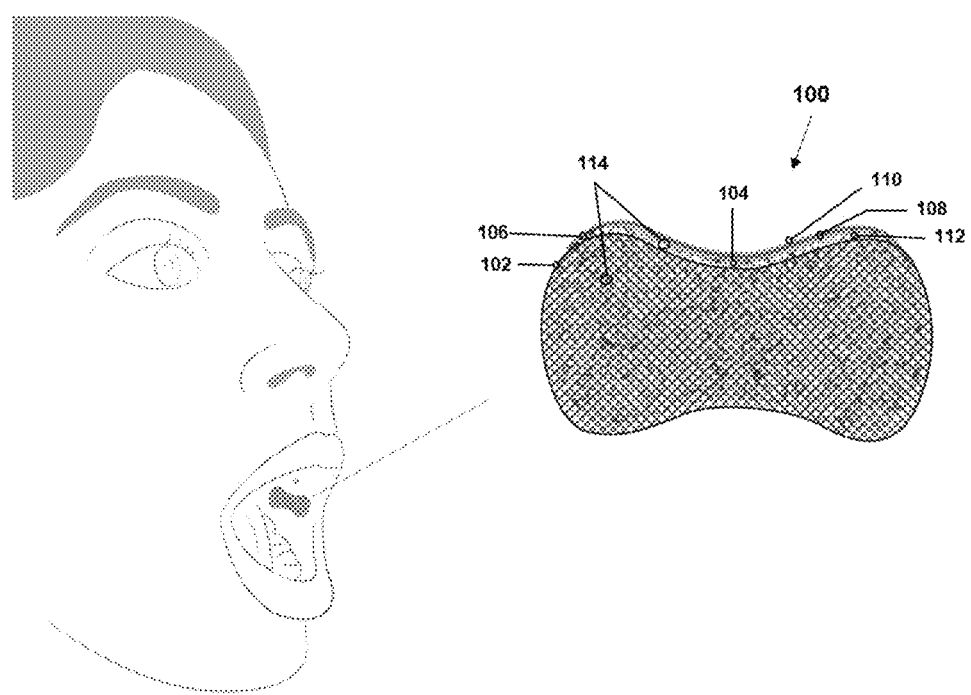
FIG. 2 illustrates a profile view of the hydrating patch and the placement of the hydrating patch in the mouth of the user as an embodiment of the present subject matter.

FIG. 2 illustrates a profile view of the hydrating patch as an embodiment of the present subject matter. The hydrating patch 100 is shown with all the components assembled. The absorbent inset 106 is attached to the biocompatible matrix 102.

The hydrating patch can be formed in any desired size and shape. FIG. 2 illustrates a preferred shape of the hydrating patch. The shape is designed for comfortable placement in the buccal area of the cheeks. After the hydrating patch 100 is stuck inside the oral cavity, it can be temporarily removed and stuck again. Hence the hydrating patch is reusable during a prescribed usage lifetime. The usage time of the hydrating patch 100 can be typically one day after which it is disposed. This helps is ensuring hygienic conditions of usage. The hydrating patch 100 being composed of biodegradable materials can be disposed in an environment friendly manner.

Figure 3A:
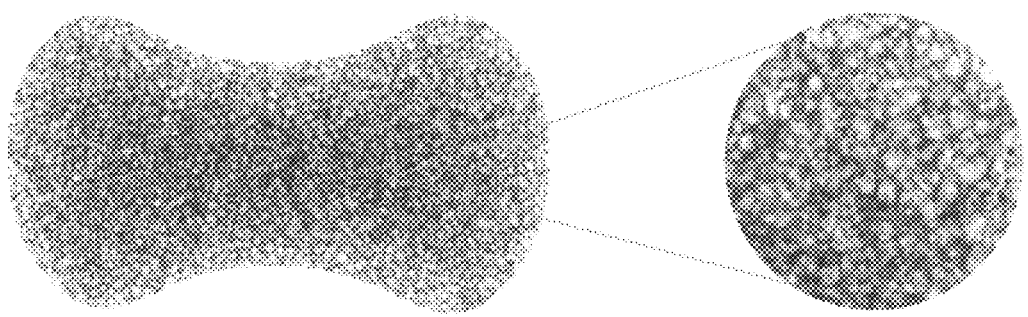
FIG. 3(a) illustrates a profile view of an absorbent inset in a dry state with a subset figure showing the enlarged view of the porous microstructure of the absorbent in the dry state as an embodiment of the present subject matter.

FIG. 3(a) illustrates a profile view of the absorbent inset 106 in the dry state as an embodiment of the present subject matter. When the water content in the absorbent inset 106 is low, the absorbent inset 106 is in a dry state. When the absorbed water is discharged during use, the absorbent inset 106 reaches the dry state. In the dry state, the absorbent inset 106 remains attached to the biocompatible matrix 102. But as the volume of the absorbent inset 106 is reduced in the dry state, only part of the cavitated substructure 104 is occupied. As the absorbent inset 106 is contacted with water, water is reabsorbed. The exposed area 114 is contacted with water by intake of water in the oral cavity and the water is reabsorbed. The cavitated sub-structures 104 in the absorbent insert allow the water to fill-in and as the material per se uptake water into its molecules. The molecular network in the biomaterial are long and entangled by the network. Within the networks of the pores these antimicrobial and flavoring agents are embedded that helps to slow release. Some molecules in the antimicrobial and flavoring agents may be chemically bound to the biomaterial. The hydrophilic nature of the biomaterial in the absorbent insert allows the absorbance of water along with antimicrobial agent and flavoring agent.

Figure 3B:
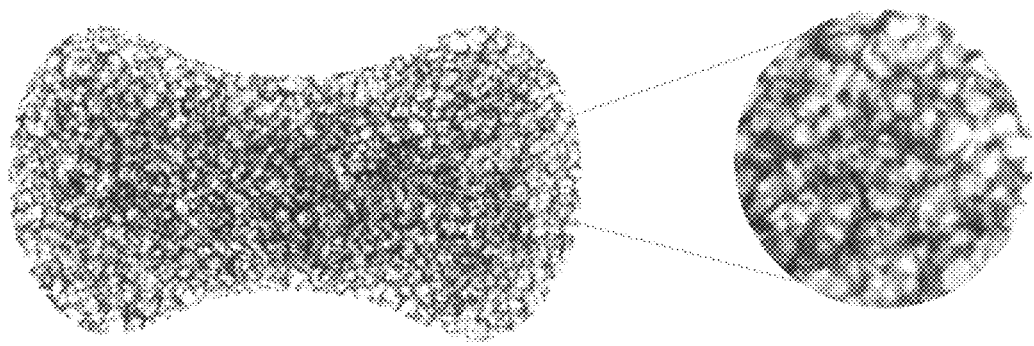
FIG. 3(b) illustrates a profile view of the absorbent inset in a swollen state with a subset figure showing the enlarged view of the porous microstructure of the absorbent in the swollen state as an embodiment of the present subject matter.

FIG. 3(b) illustrates a profile view of the absorbent inset 106 in a swollen state as an embodiment of the present subject matter. By absorption of water, the absorbent inset 106 reaches a swollen state. In an implementation, the absorbent inset 106 can increase up to 200% in weight. Since the water to absorbent ratio is high, the hydrating patch 100 can be used for a long duration of time before the requirement of recharging arises. In the swollen state, the absorbent inset fills the cavitated substructure 104. Even though the volume of the absorbent inset 106 has increased in the swollen state, the exposed area 114 is relatively same as that in the dry state. As the discharge of water occurs only through the exposed area 114, and when the cheek, lips, and tongue are moved, water is slowly discharged. Hence the usage time of the hydrating patch 100 before recharging the dry state is long.

The present invention will be further described with example implementations.

In an example implementation of the present invention, the absorbent insert, is a hydrophilic biomaterial that is absorbing water within pores of the network and release adequate amount during movement of the facial muscle and tongue pressure. Collagen is the most abundant protein (25-30% of total protein), which makes up around one-fourth of the body protein, three-fourths of the skin, more than 90% of tendon and corneal tissues, and almost 80% organic matter of bones in human. Fibrillary collagens are most abundant in vertebrates and play a structural role by contributing to the mechanical properties of tissues, molecular architecture and shape. It is a highly versatile material that is extensively used in the biomaterial applications since 1910 due to its biocompatibility, biodegradability and flexibility to be reconstituted. Common sources of collagen in use for biomedical applications include bovine tendons, intestine and skin, porcine skin and intestine, fish scale and swim bladder and rat tail tendon. In an embodiment includes type I atelocollagen from bovine tendon as absorbent matrix. Other sources such as marine type I atelocollagen may be used as an alternate. Atelocollagen is soluble in synthetic and organic acids such as hydrochloric acid, citric acid, acetic acid and formic acid at pH lower than 5. In the example implementation, the collagen is solubilized in acetic acid at 0.05M and prepared as 0.5% to 1% aqueous solution.

The high viscous atelocollagen solution is mixed with natural antimicrobial agent aleovera (bitterness) and the flavoring agents such as L-Menthol, Orange oil, 4-Hydroxy-2,5-dimethyl-3(2H)-furanone, and Fennel oil to form an aqueous solution of absorbent matrix. The amount of aleovera added is 1 mg to 2 mg per ml of absorbent insert in its solution state. The concentration is from ten to twenty times of the antimicrobial concentration detected against oral pathogens such as *Streptococcus mutans, Porphyromonas gingivalis* and *Candida albicans*. The synthetic antimicrobial agent such as chlorohexidine, tetracycline, amoxicillin and other drugs that treating ulcer can be used as alternatives. The aqueous solution of absorbent matrix consisting of antimicrobial and flavoring agents is poured into molds at 8 ml to 10 ml per square centimeter. The thickness is in the range of 4 to 7 mm. The mold may be formed using metal, aluminum or plastic at desired size. The biocompatible porous matrix is placed on the top of the aqueous layer and placed in freeze dryer. Drying may take from 24 to 48 hrs depends on the quantity of mold and capacity of the freeze dryer. After drying, the hydrating patch is de-molded and the edges are sealed.

The sticking layer is prepared with gelatin or carboxymethyl cellulose at the concentration of 1% to 2% in distilled water and poured into the plastic mold at the rate of 1 ml to 2 ml per $cm^2$ and dried at 37° C. for 8 to 10 hrs. This forms smooth layer of adhesive material. The sticking layer can be formed using other adhesive materials such as Xanthan gum, gum Arabic, Konjac gum independently or in combinations. The sticking layer is applied on the hydrating patch. Top porous layer is easily distinguishable from the sticking layer, which makes easy identification by the patients and the same is labelled in the packing material. Each hydrating patch is packed in a pouch that is sterilized using gamma irradiation for storage.

The hydrating patch made by the process described above, is placed in the buccal cavity of Patient's mouth as dry patch with sticking layer on the mucosal side. The stickiness allows the hydrating patch to stick to the buccal mucosa. The patient is then instructed to intake water to hydrate the patch. The hydrating patch can also be pre-wetted in water and used. The patient can talk while having the hydrating patch in the mouth. Further, the patient may be instructed to place food on the other side when eating food. The functioning of the hydrating patch is not affected by eating food and hence the patch need not be removed while eating. The only drawback is that the hydrating patch may get stained from the food.

The hydrating patch absorbs 10 to 15 fold of water based on its dry weight. Various facial muscle movement and tongue pressures, 1 kPa to 40 kPa results in the release of 30% to 80% of the water from the hydrating patch. The hydrating patch has the potential to re-absorb the water that keep it hydrated when patient drink water each time. The size of 15 square centimeter hydrating patch is known to absorb 4 ml to 5 ml of water.

The absorbent insert will slowly degrade by salivary enzyme and the crosslinking such as UV irradiation of the hydrating patch reduces the degradation rate. The significant portion of the absorbent insert will stay remain even after desired time point of usage. The matrix typically lasts in the mouth for at least nine hours without significant degradation. The absorbent insert being a biocompatible and bio-degradable material, can be slowly degraded by specific salivary enzymes. The absorbent insert composed of collagen, which make it as biocompatible and the degraded material does not harmful when swallowed as it will be peptide or amino acids. The hydrating patch is reusable but after a suggested time period of use can be disposed. As the hydrating patch comprises components which are biodegradable material, disposal of the patch is safe.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. A biodegradable hydrating patch (100) comprising:
an absorbent inset (106) (a) comprising an aqueous solution comprising (i) type I atelocollagen and (ii) aloe vera at a concentration of 1 mg to 2 mg per mL of the aqueous solution, and (b) having a thickness in the range of 4 mm to 7 mm;
a biocompatible matrix layer (102) having a flexible netted structure having pores therethrough; and
a sticking layer (110), wherein the absorbent inset (106) is disposed between the biocompatible matrix layer (102) and the sticking layer (110).

2. The biodegradable hydrating patch (100) as claimed in claim 1, wherein the sticking layer (110) comprises gelatin, carboxymethyl cellulose, xanthan gum, gum Arabic, konjac gum, or combinations of one or more thereof.

3. The biodegradable hydrating patch (100) as claimed in claim 1, wherein the absorbent inset (106) further comprises a synthetic antimicrobial agent.

4. The biodegradable hydrating patch (100) as claimed in claim 3, wherein the synthetic antimicrobial agent comprises chlorohexidine, tetracycline, and/or amoxicillin.

5. The biodegradable hydrating patch (100) as claimed in claim 1, wherein absorbent inset (106) has a shape complimentary to the netted structure of the biocompatible matrix layer (102).

6. The biodegradable hydrating patch (100) as claimed in claim 1, wherein the biocompatible matrix (102) is biodegradable.

7. The biodegradable hydrating patch (100) as claimed in claim 1, wherein the absorbent inset (106) comprises a cavitated substructure (104).

8. The biodegradable hydrating patch (100) as claimed in claim 2, wherein the sticking layer (110) is reusable to allow the biodegradable hydrating patch (100) to be removed from the oral cavity and stuck again in the oral cavity.

9. The biodegradable hydrating patch (100) as claimed in claim 1, wherein the type I atelocollagen comprises type I atelocollagen from bovine tendon.

10. The biodegradable hydrating patch (100) as claimed in claim 1, wherein the type I atelocollagen comprises marine type I atelocollagen.

11. The biodegradable hydrating patch (100) as claimed in claim 1, wherein the absorbent inset (106) further comprises one or more flavoring agent.

12. The biodegradable hydrating patch (100) as claimed in claim 11, wherein the one or more flavoring agent is selected from L-menthol, orange oil, 4-hydroxy-2,5-dimethyl-3(2H)-furanone, and fennel oil.

* * * * *